June 29, 1971  J. A. HOLLY  3,588,948
MOLDING DEVICE FOR PLASTIC MATERIAL
Filed Oct. 13, 1969  3 Sheets-Sheet 1

INVENTOR
JAMES A. HOLLY
BY Hofgren, Wegner, Allen, J. Ullman & M...
ATTORNEYS.

United States Patent Office 3,588,948
Patented June 29, 1971

3,588,948
MOLDING DEVICE FOR PLASTIC MATERIAL
James A. Holly, Olympia Fields, Ill., assignor to
Hollymatic Corporation
Filed Oct. 13, 1969, Ser. No. 865,628
Int. Cl. A22c 7/00
U.S. Cl. 17—32                                    15 Claims

ABSTRACT OF THE DISCLOSURE

Molding apparatus for molding or shaping portions such as pattties of a moldable material such as a food material in which a movable feeder in a hopper is operated for forcing successive portions of material from the hopper into a shaping mold opening and with improved means for retaining the feeder in fixed position, applying pressure to the material until the mold opening has been moved out of material receiving position and for releasing the retaining means after the mold opening has been moved out of this position.

---

In applicant's prior Pat. 3,417,425, issued Dec. 12, 1968 and assigned to the same assignee as the present application, there is disclosed and claimed an apparatus for molding successive articles such as food patties from moldable material such as plastic food material in which the apparatus is inexpensive, simple to operate, easy to clean and is of small size and occupies small space. One of the necessary features of this prior apparatus is means for reciprocating a feeder so as to apply pressure to the material to force it through a passage means into a shaping mold opening in a movable mold. In order to require only minimum power the apparatus of the patent includes a catch that operatively retains the feeder in its fully extended pressure applying position to keep pressure on the moldable material until the mold opening has been moved out of communication with the passage means through which the material flows under pressure from the feeder to the mold opening. Then, after the mold opening has thus been moved out of communication with the pressurized plastic material in the hopper, there is provided a device for automatically releasing the catch so that the feeder can be returned to an initial position preparatory to molding the next article in the series.

One of the features of this invention is to provide an apparatus of this type but having improved catch structure and a release therefor that is more reliable, quieter, that does not fail in its operation and that cannot release too soon with resultant release of pressure on the contained article in the mold opening.

The invention will now be described in conjunction with one embodiment thereof as shown in the accompanying drawings. Of the drawings:

FIG. 4 is a fragmentary vertical longitudinal sectional view through a portion of the apparatus of FIGS. 1 and 2.

FIG. 5 is a fragmentary rear elevational view of the apparatus as shown in FIGS. 1 and 2.

Figure 1:
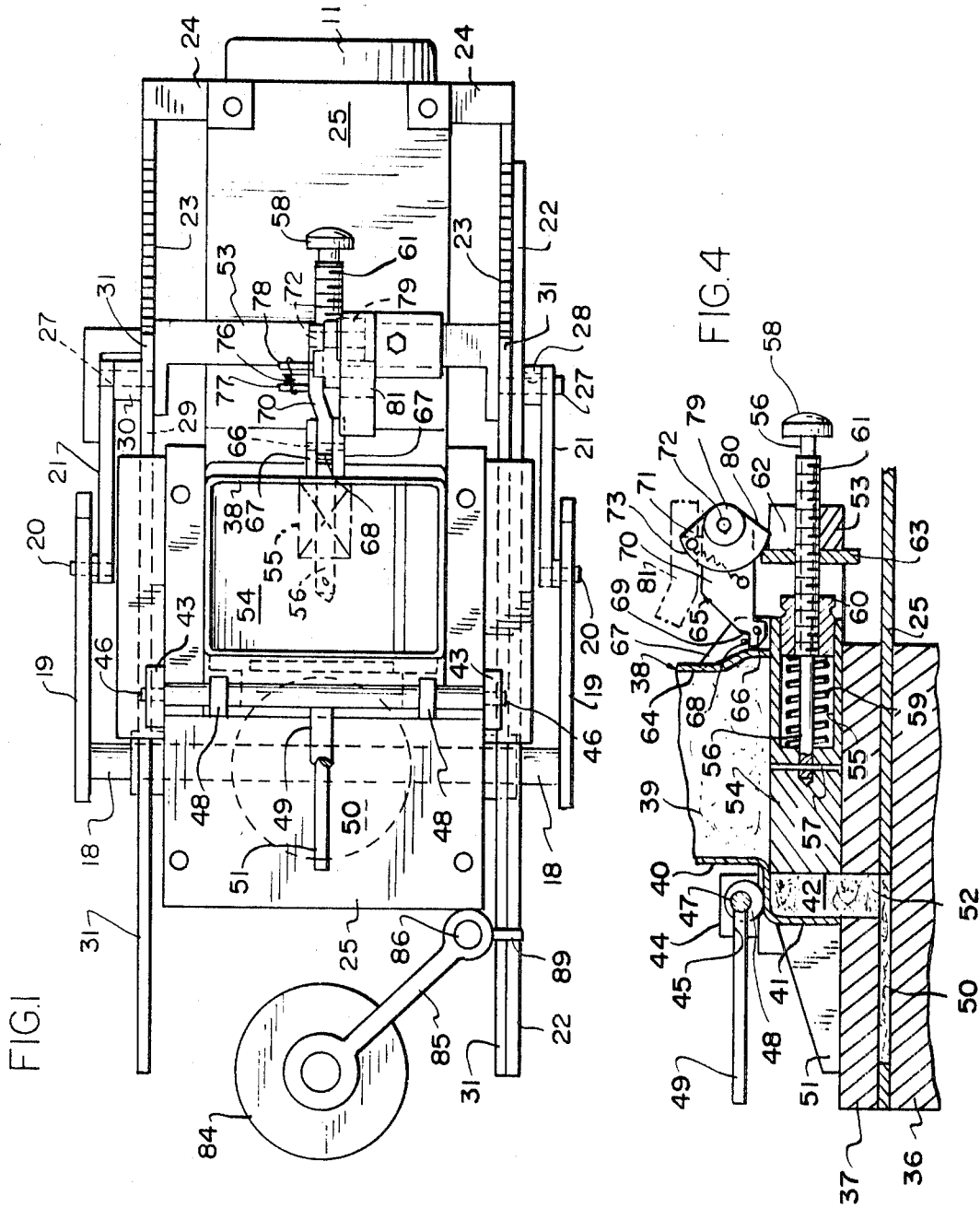
FIG. 1 is a plan view of a portion of a molding apparatus embodying the invention.

The molding device or apparatus illustrated in the accompanying drawings comprises a base housing 10 with a drive motor 11 extending to the rear (the right of the apparatus as viewed in FIGS. 1–3) with this motor rotating a shaft 12 through a gear reducer 13. The shaft 12 is rotated in a counterclockwise direction as viewed from the front of FIG. 2 as indicated by the arrow 14. This rotation of the shaft 12 rotates a link 15 that has one end attached to the shaft 12. The link 15 is rotatably attached to a second link 16 on the end of link 15 that is opposite the shaft 12. The other end of link 16 is rotatably attached to a drive arm 17. The links 15 and 16 and arm 17 are within the base housing 10.

Figure 2:
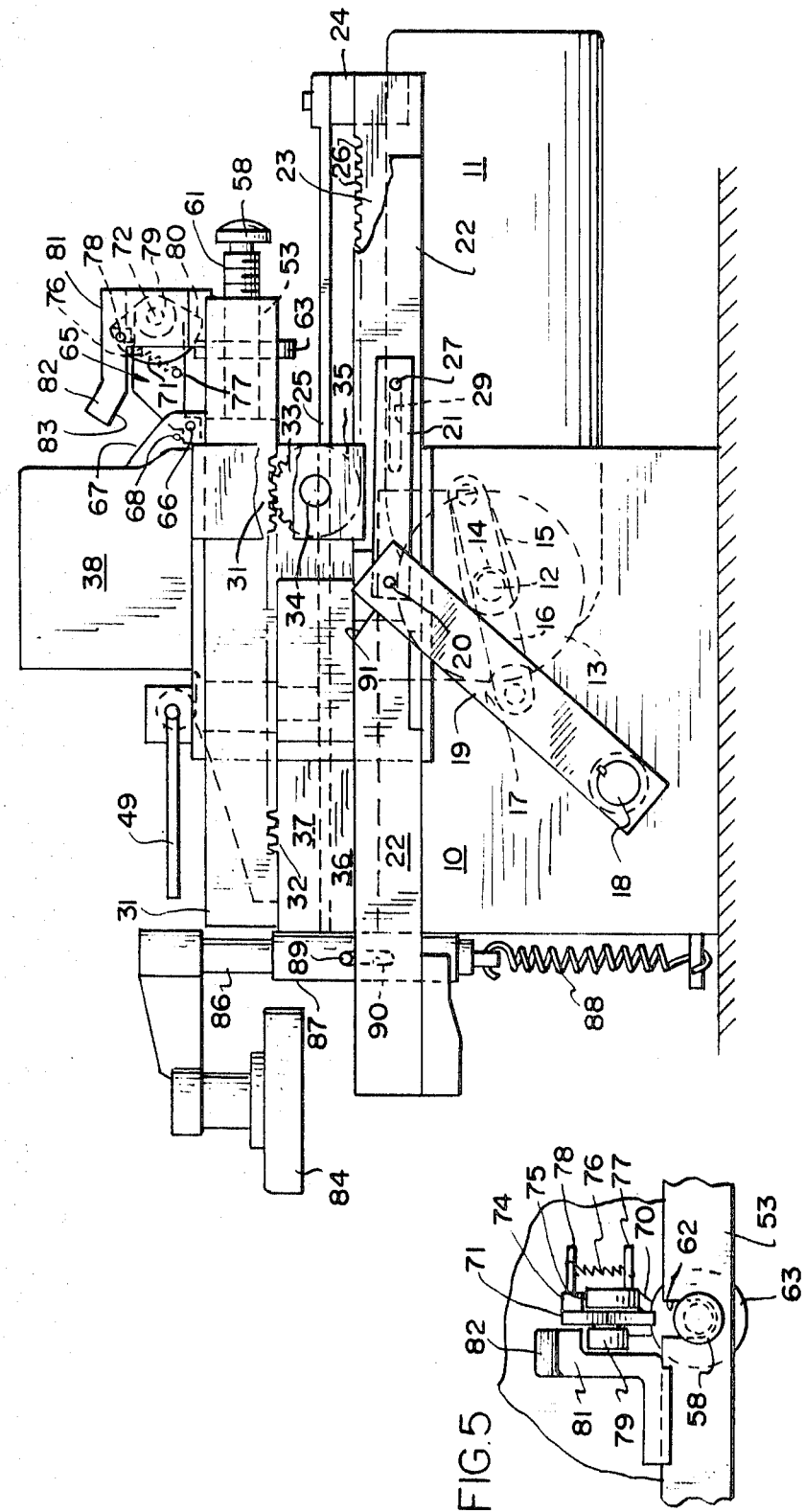
FIG. 2 is a side elevational view of the apparatus of FIG. 1.
Figure 3:
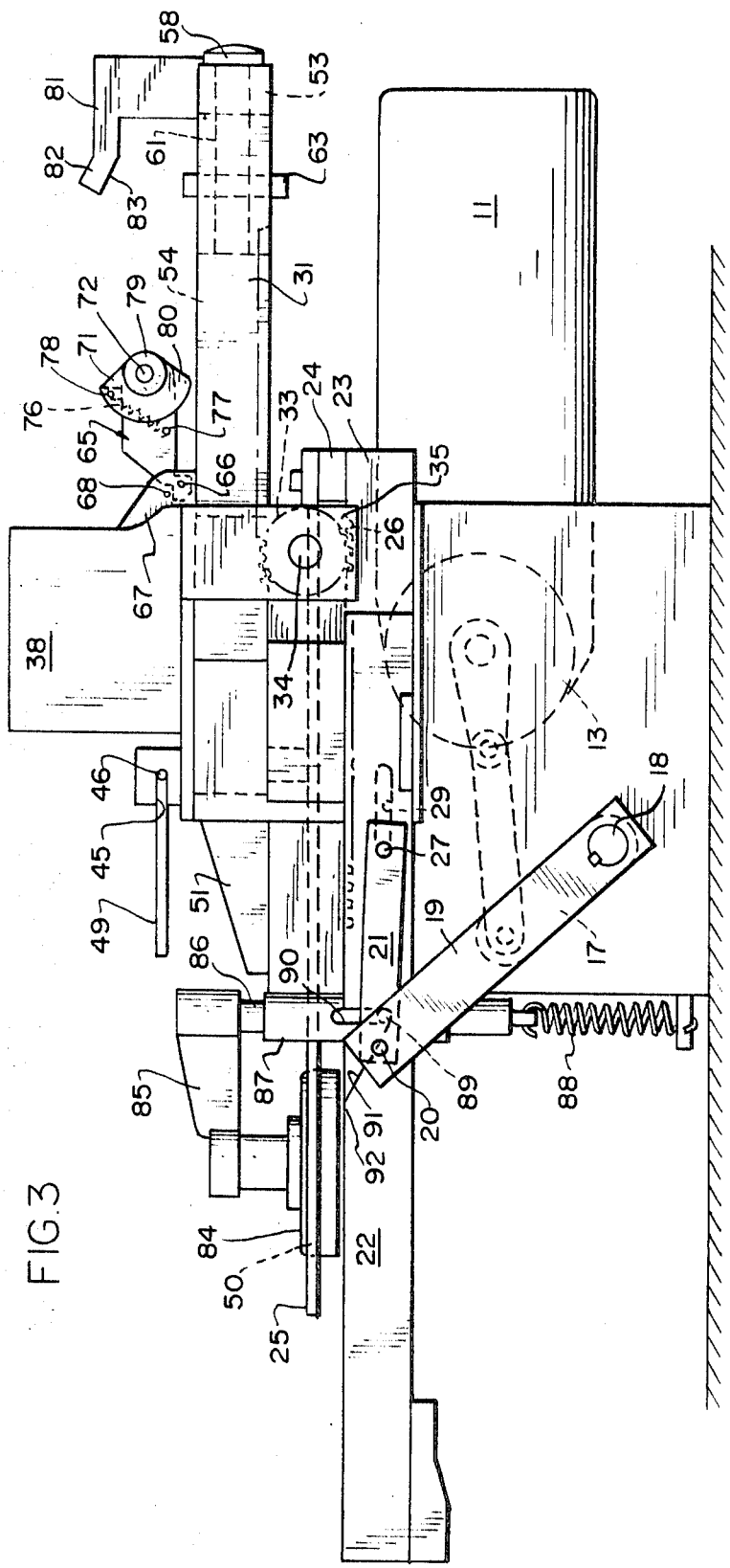
FIG. 3 is a view similar to FIG. 2 but showing the movable mold plate in fully extended patty removal position which is the other extreme of its movement from the retracted filling position of FIGS. 1 and 2.

With this construction the rotation of the shaft 12 in a counterclockwise direction rotates the first link 15 and oscillates the drive arm 17 between the two extreme positions of FIGS. 2 and 3. Because the bottom end of this drive arm 17 is attached to a transverse shaft 18 it also oscillates this shaft 18 about its central axis.

The transverse shaft 18 has its opposite ends extending outwardly beyond the front and back of the base housing 10. Each exposed end of the shaft 18 has attached thereto a lever 19 with the result that when the shaft 18 is oscillated in the manner described two levers 19 will be similarly oscillated about the central axis of the transverse shaft 18. The upper end of each lever 19 or the end opposite the shaft 18 is oscillatably connected by a hinge pin 20 to the forward end of a generally horizontal drive link 21. The rear end of the front drive link 21 is connected to a horizontal front side cam plate 22 that is mounted for horizontal reciprocation on the front of the apparatus.

Arranged at the front and rear sides of the apparatus and substantially parallel to each other are a pair of first or lower horizontal racks 23 that are attached by means of side brackets 24 located at the rear of the racks 23 to the rear end of a horizontal reciprocable mold plate 25. This pair of racks 23 have teeth 26 exposed upwardly. The cam plate 22 is located against the front surface of the front rack 23 and is horizontally movable relative thereto.

A drive connection between the side links 21 and the first racks 23 and through the brackets 24 to the mold plate 25 is provided by horizontal pins 27 at the front and rear of the apparatus as shown in FIG. 1. The front pin 27 extends rearwardly from the front drive link 21 through a spacer 28 (FIG. 1) and through the cam plate 22 into engagement with the front of the pair of first racks 23. This front pin 27 engages a horizontally elongated slot 29 (FIG. 2) in the front first rack 23 and thereby provides a lost motion connection to the first rack 23 and thus the mold plate 25. The purpose of this lost motion connection will be described hereinafter.

The opposite pin 27 also has its outer end engaging the rear drive link 21 and extends from there through a spacer 30 and into the rear first rack 23 where it engages a slot 29 therein exactly the same as the slot 29 in the front rack 23.

Positioned above and parallel to each first rack 23 is a second rack 31. The teeth 32 of the two racks 31 face and are parallel to and immediately above the teeth 26 of the first racks 23. Located between and in engagement with each corresponding pair of vertically spaced racks 23 and 31 is a gear wheel 33 each mounted on an axle 34 for rotation thereof with each axle held in a side vertical bracket 35.

The mold plate 25 which is connected to the pair of first racks 23 by the pair of rear brackets 24 is horizontally slidable between a bottom plate 36 and a top plate 37. Releasably mounted on the top of the plate 37 is a hopper 38 for holding a supply 39 of moldable material such as ground raw beef for making hamburger patties. The hopper 38 has a forward side 40 that is provided with a forward step portion 41 providing a front cavity 42 extending across the bottom of the hopper. This portion 41 has a flat upper surface which is utilized in releasably clamping the hopper 38 to the frame of the apparatus. In the embodiment illustrated this clamping is provided by side upwardly extending arms 43 on opposite sides of the apparatus with each arm having an upper end 44 extending above the top of the step portion 41 and provided with a forwardly extending horizontal slot 45 that releasably retains a reduced end 46 of a horizontal rod 47. This rod carries intermediate the arms 43 a pair of cams 48 that are generally circular but arranged eccentrically to the axis of the rod 47 as shown most clearly in FIG. 4.

The rod 47 is also provided at about its midpoint with a forwardly extending handle 49 for rotating the rod 47 about its axis and thus the cams 48 so that the cams 48 when in the position shown releasably lock the hopper 38 in position. Then to release the hopper 38 as well as the pressure plates 36 and 37 and the mold plate 25 therebetween it is merely necessary to turn the handle 49 in a clockwise direction from the position shown in FIG. 4 so as to release the pressure of the cams. The rod 47 and the associated cams can then be moved forwardly thereby disengaging the rod ends 46 from the forwardly opening horizontal slots 45.

In order to assist in holding the top plate 37 in unyielding sealed relationship with the reciprocable mold plate 25 particularly during the time when pressure is being applied to the moldable material for forcing it into the mold opening 50 in the mold plate 25 there is provided a forwardly extending holdown foot 51 extending forwardly from the step portion 41 and bearing against the top of the plate 37 as shown in FIG. 4.

The second or upper racks 31 which are driven in opposite directions from the corresponding first racks 23 are used to operate the feeder mechanism which forces the material such as the ground raw meat from the hopper 38 into the mold opening 50 by way of the front cavity 42 and a substantially vertical feed slot 52 that extends through the top plate 37. This feed slot 52 is so positioned that it communicates with the rear of the mold opening 50 during the filling of this opening when the mold plate 25 is in its rearmost or retracted position as shown in FIGS. 1, 2 and 4.

The pair of second racks 31 are arranged on opposite sides of the apparatus and the rear ends of these racks are connected by means of a cross bar 53. Upon movement of the side second racks 31 in the manner described this cross bar 53 moves in a horizontal path forwardly and rearwardly between the position shown in FIGS. 1 and 2 and the retracted position of FIG. 3. In front of the cross bar 53 in the bottom of the hopper 38 there is located a feeder or ram 54 that is reciprocable in a horizontal path from substantially entirely outside the hopper 38 as shown in FIG. 3 to almost entirely within the hopper as shown in FIGS. 1 and 4. This movement forwardly into the hopper 38 at the bottom thereof forces material 39 from the bottom of the hopper into the mold opening 50 which then is beneath the feed slot 52 with the material flowing downwardly in front of the feeder 54 through the aligned front cavity 42 and slot 52 into the patty shaped mold opening 50. As can be seen in FIG. 4 the feeder 54 during this reciprocation slides on the top surface of the top plate 37.

In the rear of the ram 54 there is provided a cylindrical rearwardly opening cavity 55 in which is located substantially axially thereof a pin 56 whose forward end is attached to the feeder 54 beyond the cavity 55 by a vertical tie rod 57. The rear end of the pin 56 extends well beyond the cross bar 53 and is provided with an enlarged button 58.

Located within the cavity 55 and surrounding the pin 56 is a helical spring 59 whose forward end bears against the forward end of the cavity 55 and rear end bears against a cylindrical nut 60 which is slidable within the cavity 55 as a piston. This nut 60 is adjustable to apply a desired precompression pressure to the spring 59 by being threaded to a threaded tube 61 through which the pin 56 extends. As shown in FIG. 4 the forward end of this tube 61 is located within the nut 60 while the rear end is in front of the button 58. The center of the cross bar 53 is recessed in a U-shaped cut 62 in which the threaded tube 61 is located.

Also threaded to the tube 61 and in front of the cross bar 53 is an adjustable drive collar 63 which also serves as a catch retainer for a catch 65 as will be hereinafter described.

At the rear side 64 of the hopper 38 is the catch 65 having its front end hingedly mounted by a pin 66 on a base member here embodied in a pair of closely spaced parallel brackets 67 between which the pin 66 extends as shown in FIG. 1. The catch 65 is held generally horizontally by means of a retainer pin 68 that also extends between the brackets 67 and that is engaged by the top surface of the forward end of the catch 65. With this construction as shown in FIG. 4 catch 65 can move upwardly around the pin 66 but is prevented from moving downwardly from the horizontal position of FIG. 4 by the engagement of the retainer pin 68 with the read end of the catch 65. This pin 68 is above and forwardly of the hinge pin 66 and when the catch 65 is in the horizontal position shown in FIG. 4 the retainer pin 68 is in a notch 69.

The catch 65 comprises a rearwardly extending arm 70 whose forward end is held by the above described hinge pin 66 with the rear end of the arm 70 carrying a catch member 71 rotatably mounted on a transverse axle 72. Thus the member 71 is rotatable on the arm 70 about an axis of rotation which coincides with the central axis of the axle 72.

The catch member 71 has an arcuate peripheral forward surface 73 that is substantially concentric with its axis of rotation and which extends through an arc of greater than 90°. The catch member 71 is normally held in a vertical position as shown in FIG. 4 by a stop means 74 on its upper end which engages the top surface of the arm 70. The catch member 71 is urged into a vertical position with the stop 74 against the surface 75 by yielding means in the form of a spring 76 stressed between a bottom pin 77 attached to the arm 70 and a top pin 78 attached to the top of the catch member 71 as shown most clearly in FIG. 5.

The catch member 71 has projecting therefrom toward the front of the apparatus a roller extension 79 that has a circular peripheral surface substantially coaxial with the mounting axle 72. As can be seen in FIG. 4, the diameter of this roller 79 is considerably smaller than the corresponding diameter of the arcuate surface 73.

The rear surface 80 of the catch member 71 at the bottom of the arcuate peripheral surface 73 is substantially straight and angles downwardly and forwardly when the catch is in the retaining position of FIG. 4. This arrangement is provided so that as the cross bar 53 is moved forwardly by its side first racks 23 to move the feeder 54 forwardly from the position shown in FIG. 2 to the position shown in FIGS. 1 and 4 the drive collar 63 which also serves as a catch retainer first engages this sloped rear surface 80 and turns the catch member 71 clockwise, as viewed in FIG. 4, against the urging of spring 76, thereby permitting the retainer 63 to pass under the catch member 71. The spring 76 thereupon pulls or "snaps" the catch member 71 in a counterclockwise direction as viewed in FIG. 2 so that the bottom of the catch member 71 is now behind the retainer 63 thereby holding the feeder 54 in its forwardmost position of FIGS. 1 and 4.

Because of the curved surface 73 the rearward reaction pressure caused by the compressive force on the moldable material ahead of the feeder 54 as well as the compression on spring 59 tends to force the retainer 63 rearwardly or to the right in FIG. 4. This rearward pressure on the arcuate surface 73 at the bottom of the catch member 71 tends to force the catch member upwardly and release the catch. In order to prevent this there is provided means for preventing premature disengagement of the catch 65 from the retainer collar 63 as will be described hereinafter.

As is evident from the structure described the apparatus provides means movable in a path for moving the feeder toward and away from the passage means embodied in the front cavity 42 and the feed slot 52 for forcing moldable material such as ground meat into the mold opening 50. This movable means includes a pair of interconnected linkages. One linkage which includes the button 58, pin 56, collar 63, nut 60, threaded tube 61 and spring 59 is movable relative to the other linkage which includes the first racks 23 and cross bar 53. The extent of this movement of the linkages relative to each other is limited rearwardly by the button 58 and forwardly by the collar 63.

In order to prevent accidental separation of the catch member 71 from the retainer collar 63 the cross bar 53 carries means for preventing disengagement of the catch from the retainer until the pair of linkages have been moved apart in the portion of the path of movement defined by the spacing of the collar 63 and button 58 as described. This means for preventing premature disengagement is embodied in a generally horizontal stop bar 81 mounted on the cross bar 53. When the cross bar 53 is in its forward position as shown in FIGS. 1, 2 and 4 with the catch member 71 in retaining position behind the retaining collar 63 the stop bar 81 overlies the roller extension 79 thereby preventing upward movement of the arm 70 about its hinge pin 66. However, the stop bar 81 is of such length that on the retracting movement of the first racks 23 and the cross bar 53 therebetween to withdraw the feeder 54 from the position of FIGS. 1 and 4 to the position of FIG. 3, stop bar 81 is clear of the catch by the time the bar 53 reaches the button 58. This permits the upward pressure of the rear top of the collar retainer 63 on the bottom of the arcuate surface 73 to push the catch upwardly so that the collar 63 is released and continued rearward movement withdraws the feeder 54 to its rearmost position preparatory to another forward feeding stroke.

In the preferred embodiment as shown the stop bar 81 is provided with an upwardly sloped front end 82 to provide a sloped front surface section 83. This surface 83 provides a wedge surface forcing the catch 65 downwardly and into engagement with the retainer collar 63 as the side racks 23 and cross bar 53 are moved forwardly.

As is described more fully in the above-mentioned prior Pat. 3,417,425 the cam plate 22 also provides a knockout arrangement for expelling the patty from within the mold opening 50 in the extended mold plate as shown in FIG. 3. As described in this patent this knockout arrangement comprises a ring 84 mounted for vertical movement on a bracket 85 which is itself attached to a vertical rod 86 which is movable within a vertical sleeve 87. The lower end of this rod 86 extends beneath the bottom of the sleeve and is attached to a spring 88 tending to urge the rod 86, bracket and ring 84 downwardly to the knockout position shown in FIG. 3.

This vertical reciprocation of the rod 86 and associated structure is guided by the engagement of an outwardly projecting pin 89 on the rod 86 engaging a vertical slot 90 in the sleeve 87.

Once the rod 86 and ring 84 are in their lowered position as shown in FIG. 3 to remove the contained patty from the mold opening 50 the ring is raised from its position by its engagement with an upwardly and forwardly inclined surface of a notch 91 on the cam plate 22.

The operation of the apparatus of this invention is as follows. With the parts in the position shown in FIG. 3 with the bottom or first racks 23 in fully extended forward position so as to project the mold plate 25 to its forward patty removal position and with the pair of second or upper racks 31 in their retracted position so that the feeder 54 is withdrawn to its furthest rearward position, operation of the apparatus through the motor 11, gear reducer 14 and drive including the lever 19 causes clockwise movement of the lever 19 with its transverse shaft 18 from the position of FIG. 3. This causes the upper end of the lever 19 to move rearwardly and with it the drive links 21. This movement of the front drive link 21 moves its pin 27 rearwardly. Because of the engagement of this front pin 27 with the cam plate 22 the cam plate is also moved rearwardly. This movement of the cam plate 22 is without corresponding movement of the first racks 23 because the inner end of the pins engage the horizontal slots 29 in the racks. The rearward movement of the cam 22 causes the inclined surface of the notch 91 to push the knockout ring pin 89 upwardly to lift the ring 84 from within the mold opening 50 where it is located following the removal of the last preceding patty.

By the time the link pins 21 have reached the rear of their lost motion slots 29 the knockout ring pin 89 is on the top surface portion 92 of the cam plate 22 just ahead of the notch 91.

Continued rearward movement of the lever 19 toward the position shown in FIGS. 1 and 2 results in the mold plate 25 being moved to the filling position shown in FIG. 4 where the rear edge of the mold opening 50 is in communication with the feed slot 52. At the same time this rearward movement of the racks 23 through rotation of the gear wheels 33 causes the second or upper racks 31 to move forwardly and moves the attached cross bar 53 forwardly and applies pressure to the feeder 54 through the retainer collar 63, tube 61, nut 60 and compression spring 59 as described. This forces the feeder 54 to the left or to the position shown in FIG. 4 so that yieldable spring pressure of the spring 59 is applied to the moldable material in the bottom of the hopper 38 to fill the mold opening 50 to form the next patty.

During this forward feeding movement of the feeder 54, as described, the collar retainer 63 engages the rear bottom surface 80 of the catch member 71 and turns it in a clockwise direction to permit the retainer 63 to pass under the catch member 71. The spring 76 thereupon snaps the catch member 71 in a counterclockwise rotational direction to the position shown in FIG. 4 behind the retainer 63 so as to lock the feeder 54 in its forwardmost position with the preessure spring 59 compressed.

Due to the provision of the stop bar 81 which now overlies the roller extension 79 the catch 65 cannot be pushed upwardly so long as this stop bar is in position. At the beginning of the retraction of the feeder 54 preparatory to removal of the patty in the mold opening and the formation of the next succeeding patty the lever 19 is moved forwardly from its retracted position. At the initial portion of this forward movement the cross bar 53 is moved rearwardly from the position shown in FIG. 4 where it is pressed against the rear surface of the retainer 63 to engagement with the rear button 58. This rearward movement of the cross bar 53 withdraws the stop bar 81 from above the roller extension 79 so that upward pressure on the bottom of the catch member 71 permits disengagement of the catch member from the rear upper edge of the retainer 63. Then continued rearward movement of the cross bar 53 withdraws the feeder 54 to retracted position preparatory to formation of the next patty in the manner already described.

Having described my invention as related to the embodiment shown in the accompanying drawings, it is my intention that the invention be not limited by any of the details of description, unless otherwise specified.

I claim:

1. Molding apparatus for shaping a series of articles, comprising: a hopper for retaining a supply of plastic material; a movable mold operatively adjacent said hopper having a mold opening; passage means extending from said hopper for supplying said material to said mold opening; a feeder in said hopper movable toward and away from said passage means to force said material into said mold opening; means movable in a path for thusly moving said feeder including a pair of interconnected linkages movable relative to each other over a portion of said path in an initial portion of said movement of the feeder way from said passage means, one said linkage being operatively attached to said feeder; means for moving said mold to a position where said opening is out of communication with said passage means; a base member; a catch hingedly mounted on said base member; a retainer operatively attached to said one linkage engaged by said catch when said feeder is in position adjacent said passage means to hold said feeder in said position until said mold opening is out of communication with said passage means; means on said one of said linkages for preventing disengagement of said catch from said retainer until said pair of linkages have been moved apart in said portion of said path; and means for thereupon disengaging said catch and retainer.

2. The apparatus of claim 1 wherein there are provided means for interconnecting said feeder moving means and said mold moving means for joint operation thereof.

3. The apparatus of claim 2 wherein said means for interconnecting said feeder moving means and said mold moving means includes means for moving said feeder and mold opening substantially simultaneously toward said passage means and substantially simultaneously away from said passage means.

4. The apparatus of claim 1 wherein there are provided means on said catch urging the catch away from the retainer and said means for preventing disengagement comprises means for blocking said movement prior to said moving apart of the linkages.

5. The apparatus of claim 1 wherein said catch and said retainer are provided with engaging surface means for urging said catch and retainer apart.

6. The apparatus of claim 1 wherein said catch comprises an arm hingedly mounted on said base member and a catch member on said arm.

7. The apparatus of claim 6 wherein said catch member is rotatable on said arm about an axis of rotation into and out of feeder holding engagement with said retainer.

8. The apparatus of claim 7 wherein said catch member is provided with an arcuate surface that is coaxial with said axis and said surface engages the retainer at a position spaced from said axis of rotation so that the engagement of the retainer with the catch member tends to rotate the catch member about its axis.

9. The apparatus of claim 8 wherein said direction of rotation of the catch member is in the direction of engagement with the retainer.

10. The apparatus of claim 9 wherein there are provided stop means on the catch member bearing against said arm for limiting the extent of movement of the catch member in said direction.

11. The apparatus of claim 10 wherein there are provided yielding means between the catch arm and the catch member urging the catch member in said direction.

12. The apparatus of claim 1 wherein there is provided a projecting extension on said catch and said means for preventing disengagement of the catch from the retainer is arranged adjacent said extension to block said disengaging movement of the catch.

13. The apparatus of claim 6 wherein there is provided a projecting roller extension on said catch member and said means for preventing disengagement of the catch from the retainer is arranged adjacent said roller extension to block said disengaging movement of the catch.

14. The apparatus of claim 13 wherein said means for preventing disengagement comprises a stop bar overlying said roller extension when the catch member and retainer are in engagement with the bar being of a length sufficient to prevent disengaging movement of the catch until said pair of linkages have been moved apart in said portion of the path.

15. The apparatus of claim 14 wherein said stop bar is provided with a sloped front section to provide a wedge surface forcing said catch toward the retainer on initial engagement of said bar and roller extension.

References Cited
UNITED STATES PATENTS 3,347,176 10/1967 Hall _____ 17—32X
3,417,425 12/1968 Holly _____ 17—32

LUCIE H. LAUDENSLAGER, Primary Examiner